(12) United States Patent  
Gupta et al.

(10) Patent No.: US 8,608,429 B2  
(45) Date of Patent: Dec. 17, 2013

(54) SYSTEM AND METHOD FOR ENHANCED TURBINE WAKE MIXING VIA FLUIDIC-GENERATED VORTICES

(75) Inventors: Anurag Gupta, Clifton Park, NY (US); Jixian Yao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 690 days.

(21) Appl. No.: 12/789,480

(22) Filed: May 28, 2010

(65) Prior Publication Data

US 2011/0293422 A1 Dec. 1, 2011

(51) Int. Cl.  
*F03B 11/00* (2006.01)

(52) U.S. Cl.  
USPC ............... 415/115; 416/97 R; 416/236 R

(58) Field of Classification Search  
USPC ............... 415/115, 116, 914; 416/97 R, 228, 416/231 R, 231 B, 232, 235, 236 R  
See application file for complete search history.

(56) References Cited

U.S. PATENT DOCUMENTS

| | | | |
|---|---|---|---|
| 4,813,633 A | 3/1989 | Werle et al. | |
| 5,598,990 A | 2/1997 | Farokhi et al. | |
| 5,676,333 A | 10/1997 | Rethorst | |
| 5,957,413 A | 9/1999 | Glezer et al. | |
| 6,733,240 B2 | 5/2004 | Gliebe | |
| 2005/0106022 A1* | 5/2005 | MacManus | 416/97 R |
| 2008/0061192 A1 | 3/2008 | Sullivan | |
| 2008/0149205 A1* | 6/2008 | Gupta et al. | 137/829 |
| 2008/0199317 A1* | 8/2008 | Spangler et al. | 416/95 |
| 2009/0013532 A1 | 1/2009 | Wood et al. | |

* cited by examiner

*Primary Examiner* — Edward Look  
*Assistant Examiner* — Juan G Flores  
(74) *Attorney, Agent, or Firm* — Ann M. Agosti

(57) ABSTRACT

A high pressure turbine (HPT) blade includes a substantially arcuate trailing edge including one or more fluid injection elements disposed therein. Each fluid injection element injects a fluid such as air into a desired trailing edge region of the HPT blade or vane to enhance mixing out of the wakes generated via the HPT blade or vane. The enhanced mixing out reduces HPT/LPT interaction losses and/or the axial gap between the HPT and LPT components in a gas turbine engine. The interaction losses include unsteady thermal wake segregation effects that lead to unexpected heat-up of end-walls (planforms and blade/vane-tips) of downstream blades/vanes, and further include aerodynamic losses, both transonic and subsonic.

12 Claims, 12 Drawing Sheets

CRENULATED TE  
ON S.S

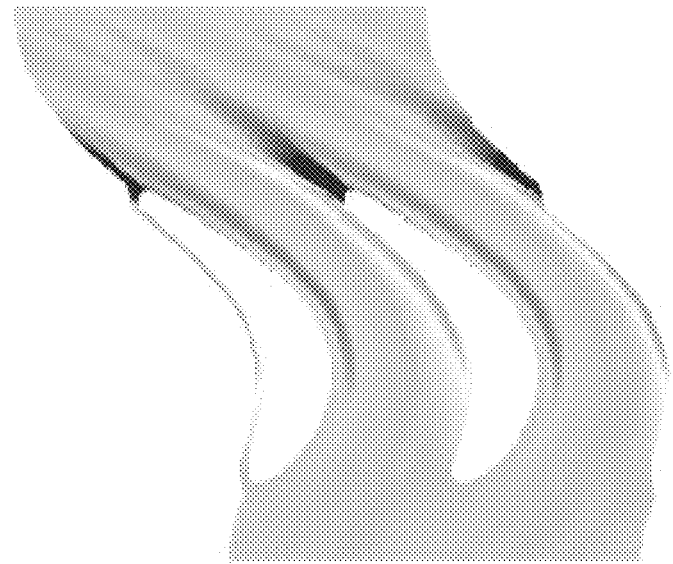
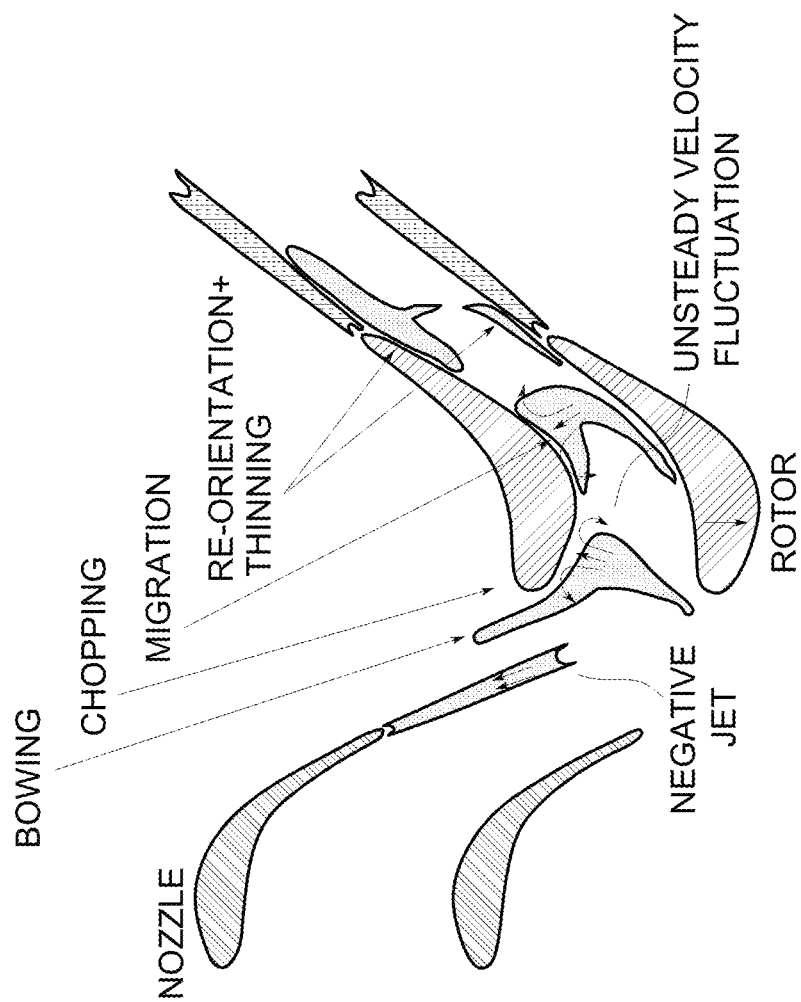
FIG. 13

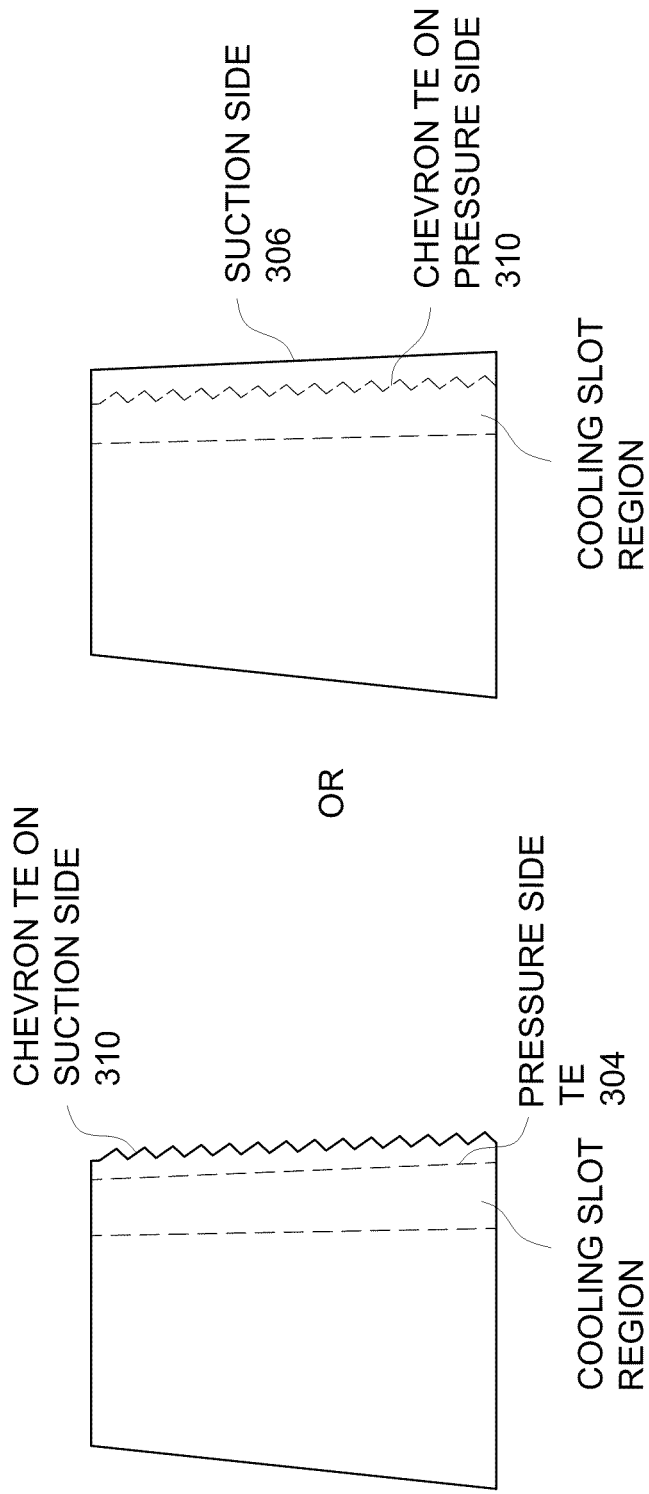

SYSTEM AND METHOD FOR ENHANCED TURBINE WAKE MIXING VIA FLUIDIC-GENERATED VORTICES

BACKGROUND

The invention relates generally to gas turbine engines and more particularly to a system and method for re-tasking, redesigning and/or manipulating the use of coolant injection holes to enhance the mixing of a gas turbine blade or vane wake to reduce HPT/LPT (high pressure turbine/low pressure turbine) interaction losses and improve the thermal durability of the turbine.

Turbine blade/vane wakes interact with turbine blade/vane shock wave systems and, if not fully mixed, with downstream blades/vanes. This process generates higher losses, and often requires extra axial spacing between the HPT and LPT to fully mix the wakes. Besides the aero-performance benefit of wake mixing, its benefit can also be extended to include the thermal effect. The wakes coming off of the film-cooled turbine vanes and blades have temperature deficits in addition to the pressure deficit. The low-momentum fluid in the wake of an airfoil (vane or blade) migrates downstream, and is ingested and turned by the downstream airfoil. The left side of FIG. 13 illustrates the wake migration. The right side of FIG. 13 illustrates that turning of the fluid in the downstream blade row causes the low-momentum fluid to accumulate near the suction side of the airfoil, while the higher momentum fluid outside of the wake moves toward the pressure side of the adjacent airfoil. Since the wake fluid is cooler compared to the fluid outside of the wake, the thermal segregation occurs in the passage of the downstream airfoil row where the coolant in the incoming wake cannot reach the pressure side. As a result, the pressure side of the downstream airfoil is hotter than the adjacent suction side, which may cause overheating of the pressure side.

Further, the wake of an upstream airfoil also introduces a secondary flow, which is often referred to as "slip" velocity, or "negative" jet if the wake has a lower velocity than surrounding flow, or "positive" jet if the wake has a higher velocity than surrounding flow. A velocity triangle illustrated in FIG. 14 depicts the negative and positive jets. Kerrebrock, J. L. and Mikolajczak, A. A., 1970, "Intra-Stator Transport of Rotor Wakes and Its Effect on Compressor Performance", ASME J. Eng. Power, Vol 92, pp. 359-370, describes that even if the fluid temperature is the same everywhere, as the flow migrates to the downstream, this secondary flow causes the transport of the fluid across the airfoil passage, which in turn causes a temperature gradient across the passage.

FIG. 1 is a perspective diagram depicting placement and operation of fluidic injection elements 10 near to but not in the trailing edge 12 of a turbine blade 14 that is known in the prior art to enhance mixing of a wake following the trailing edge 12 of the turbine blade 14. At least one fluidic-generated vortex 16 operates to enhance mixing of a wake 22 following the trailing edge 12 of the turbine blade 14. The fluidic-generated vortex 16 is generated via one or more fluidic injection elements 24 integrated near the trailing edge 12 of the turbine blade 14. Each fluidic injection element 24 is configured to inject a fluid 26 such as a stream of air into a trailing edge region of the turbine blade 14 to enhance mixing out of the wakes behind the trailing edge 12 of the turbine blade 14. The enhanced mixing out of the wakes results in a wider wake 22.

FIG. 2 illustrates a typical turbine blade 30 having a rounded style trailing edge cooling scheme that is known in the prior art, viewed in a top-down perspective in which shaded areas 32 are metal and hollow areas 34 are coolant flow pathways. Turbine blade 30 comprises a trailing edge slot 36 with straight inner walls. FIG. 3 illustrates a bleed slot trailing edge cooling scheme having a thinner trailing edge comprising a trailing edge slot with straight inner walls 38.

Although fluidic injection elements/cooling holes and slots have been employed in the prior art to provide both aerodynamic performance benefits and cooling of turbine blades/vanes, such techniques have not yet successfully addressed aerodynamic losses resulting from wake and shock interactions, both steady and unsteady for transonic vanes/blades as well as unsteady losses due to wake interactions when blades/vanes are subsonic. Further, high pressure turbines where the vanes are heavily cooled to ensure durability in high temperature environments, e.g. film and trailing edge cooling, can result in unsteady thermal wake segregation effects that lead to the unexpected heat-up of endwalls, e.g. platforms and blade/vane tips, of downstream blades/vanes. Large temperature gradients are caused by the cold wakes in combination with hot post-combustion gases, which leads to a thermal wake migration effect.

In view of the foregoing, it would be advantageous to provide a system and method to reduce both the total pressure gradient and the total temperature gradient. The system and method should re-condition the flow that goes into the downstream airfoil row via mixing of the thermal wakes of an upstream blade row to reduce the thermal load of the adjacent downstream blade row by reducing the thermal segregation effect within the downstream blade row. FIG. 16 illustrates the mixing of velocity wakes and thermal wakes in a single sketch. Two parameters are introduced to measure the wake mixing. The first is Wake Velocity Ratio (WVR), which is defined herein as a ratio of velocity integral in the wake region and that in the free-flow region. The other parameter is Wake Temperature Ratio (WTR), which is defined as a ratio of mass-weighed temperature integral in the wake region and that in the free-flow region.

BRIEF DESCRIPTION

Briefly, in accordance with one embodiment, a high pressure turbine blade or vane comprises a substantially arcuate trailing edge including one or more fluid injection structures disposed therein and configured to reduce aerodynamic losses due to wake and/or shock interactions and further configured to reduce thermal wake segregation effects to a desired level.

According to another embodiment, a high pressure turbine (HPT) blade or vane comprises a crenulated trailing edge comprising one or more chevrons disposed on the pressure side, the suction side, or both the pressure side and suction side of the trailing edge and configured to enhance mixing out of wakes generated via the HPT blade or vane, such that aerodynamic losses due to corresponding wake and/or shock interactions are reduced to a desired level, and further such that corresponding thermal wake segregation effects are reduced to a desired level.

According to yet another embodiment, a high pressure turbine (HPT) blade or vane comprises a crenulated trailing edge including one or more fluid injection structures disposed therein and configured to inject a fluid into a desired trailing edge region, wherein the injected fluid interacts with a crenulated trailing edge passage fluid flow to create a streamwise vorticity from the interaction of the injected fluid and the passage fluid flow to enhance mixing out of wakes generated via the HPT blade or vane such that aerodynamic losses due to wake and/or shock interactions are reduced to a desired level, and further such that thermal wake segregation effects are reduced to a desired level.

According to still another embodiment, a high pressure turbine (HPT) wake mixing system comprises a pre-existing HPT blade or vane comprising one or more cooling holes disposed therein outside the trailing edge of the HPT blade or vane, wherein the pre-existing HPT blade or vane is re-configured with one or more geometric elements such that fluid injected from the one or more cooling holes is manipulated via the one or more geometric elements to reduce aerodynamic losses due to wake and shock interactions and further to reduce thermal wake segregation effects to a desired level.

According to still another embodiment, a high pressure turbine (HPT) wake mixing system comprises a pre-existing HPT blade or vane comprising a substantially arcuate trailing edge, and further comprising one or more cooling slots or holes disposed therein, wherein the pre-existing HPT blade or vane is re-configured with one or more fluid injection elements disposed in the substantially arcuate trailing edge such that fluid injected from the one or more fluid injection elements interacts with fluid flowing through the one or more cooling slots or holes to reduce aerodynamic losses due to wake and shock interactions and further to reduce thermal wake segregation effects to a desired level.

DRAWINGS

These and other features, aspects, and advantages of the present invention will become better understood when the following detailed description is read with reference to the accompanying drawings in which like characters represent like parts throughout the drawings, wherein:

FIG. 13 illustrates wake migration and turning of a fluid in a downstream blade row causing low-momentum fluid to accumulate near the suction side of the airfoil, while the higher momentum fluid outside of the wake moves toward the pressure side of the adjacent airfoil according to one embodiment;

FIG. 19 illustrates a chevron trailing edge on the suction side of a turbine blade or vane according to one embodiment;

FIG. 20 illustrates a chevron trailing edge on the pressure side of a turbine blade or vane according to one embodiment;

Figure 1:
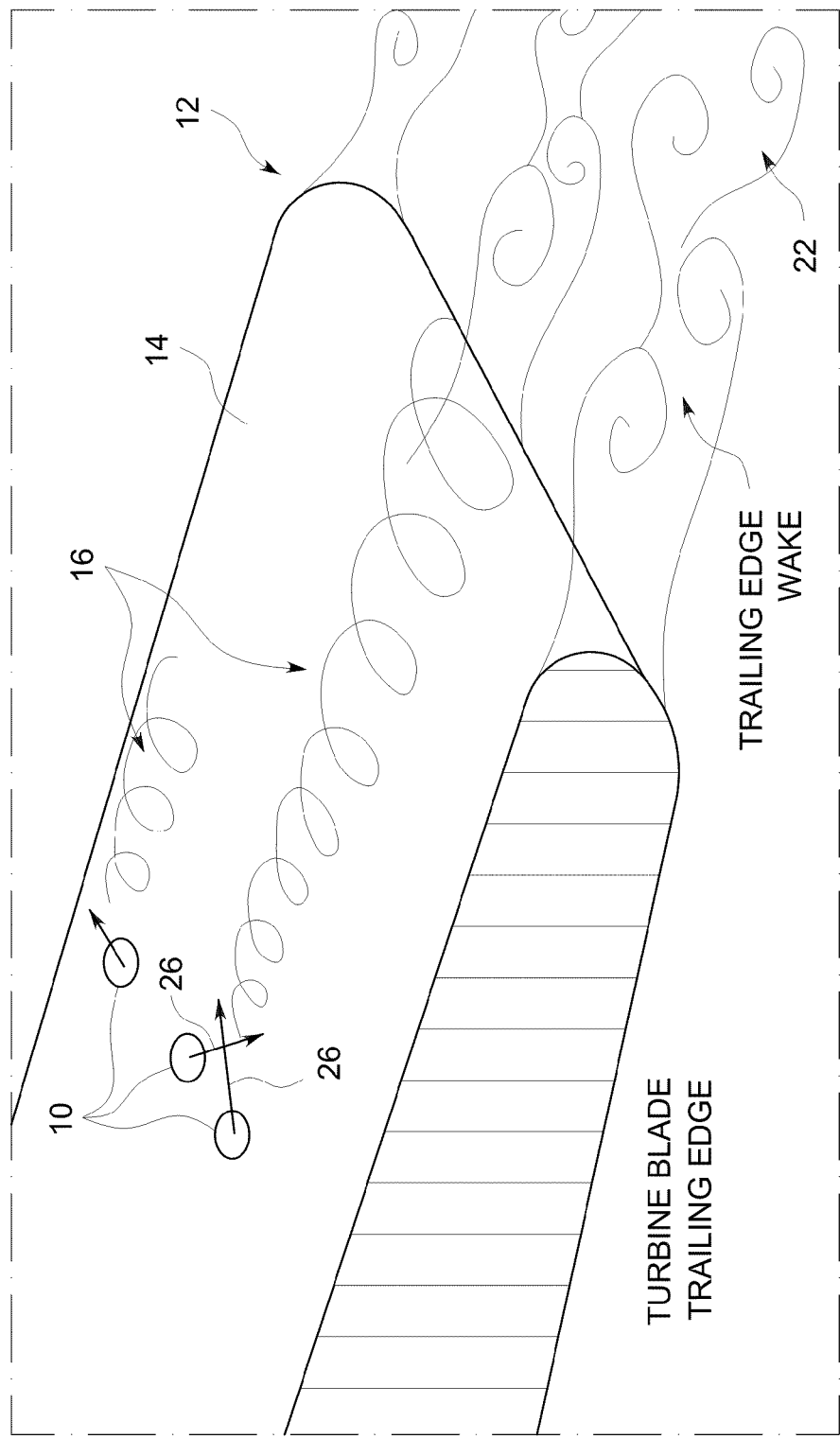
FIG. 1 is a perspective diagram depicting placement and operation of fluidic injection elements near but not in the trailing edge of a turbine blade that is known in the prior art to enhance mixing of a wake following the trailing edge of the turbine blade.
Figure 2:
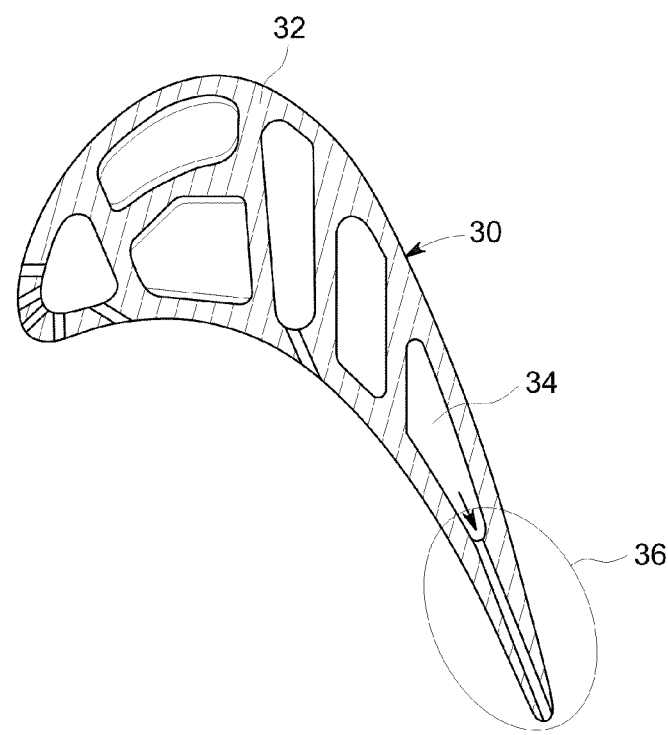
FIG. 2 illustrates a known turbine blade comprising an rounded trailing edge viewed in a top-down perspective in which shaded areas are metal and hollow areas are coolant flow pathways.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

According to particular embodiments such as those depicted in FIGS. 10-12 and 17-18 described in further detail herein, cooling hole wake mixing elements are disposed in a substantially arcuate thick trailing edge of a high pressure turbine (HPT) blade or vane to provide a trailing edge wake mixing scheme. Unlike conventional trailing edge wake mixing schemes that inject fluid parallel to the main flow path, these embodiments advantageously inject fluid at pitch and/ or yaw angles to the main flow path to generate the desired streamwise vortices described in further detail herein.

According to other embodiments such as those depicted in FIGS. 4-8 and 19-20 described in further detail herein, chevron trailing edges are provided on the pressure side, suction side, or both the pressure side and suction side of a high pressure turbine blade or vane to provide a pressure side bleed slot trailing edge wake mixing scheme.

According to yet other embodiments, fluid injection elements/structures such as those depicted in FIGS. 10-12 and 21-22 described in further detail herein, are placed to inject fluid at predetermined angles to the corresponding turbine blade wall so as to interact with a crenulated trailing edge slot wall (such as depicted in FIGS. 4-8) passage flow and create streamwise vorticity from the interaction of this injected flow and the crenulated slot passage flow. The streamwise vorticity generation and strength is tailored to interact with a corresponding wake, such as, but not limited to, a trailing edge wake, and cause it to mix out, thus reducing its velocity defect by the time it interacts with downstream traveling shocks and engine components.

These fluidic techniques for generating streamwise vorticity function to enhance wake mixing and result in fast dissipation of wakes. Fast dissipation of the wakes coming off high pressure turbine blades/vanes 14 reduces the aerodynamic losses that would otherwise result when these wakes interact with neighboring low pressure turbine (LPT) blades/vanes and their corresponding flow structures.

According to one embodiment, fluidic creation of vorticity suitable for realizing the principles described herein is achieved using steady blowing. Another embodiment may employ pulsatory blowing. Yet another embodiment employs both steady blowing and pulsatory blowing to achieve the desired streamwise vorticity. Some embodiments may further employ geometric features that enhance the creation of such vorticity. Geometric features are based upon the desired application, and may include, without limitation, holes, slots and various geometric combinations thereof. A pair of injection holes, may for example, be tailored in terms of size, and orientation of injection to create the desired or requisite features including, without limitation, strength, persistence, and frequency (if unsteady blowing is employed).

One embodiment for fluidic creation of vorticity suitable for realizing the principles described herein is achieved by modifying holes and/or slots already employed for active cooling of HPT and/or LPT turbine blade surfaces to achieve the desired streamwise vorticity. Such an embodiment utilizes existing cooling infrastructures, requiring minimal re-engineering to achieve the desired vorticity.

Means for promoting wake mixing according to the principles described herein are not limited to simple trailing edge direction ejections. They may be extended to work with additional geometrical features that cause formation of local vortices to enhance wake mixing. These features may include, without limitation, crenulated trailing edges such as depicted in FIGS. 4-8.

Figures 3, 4:
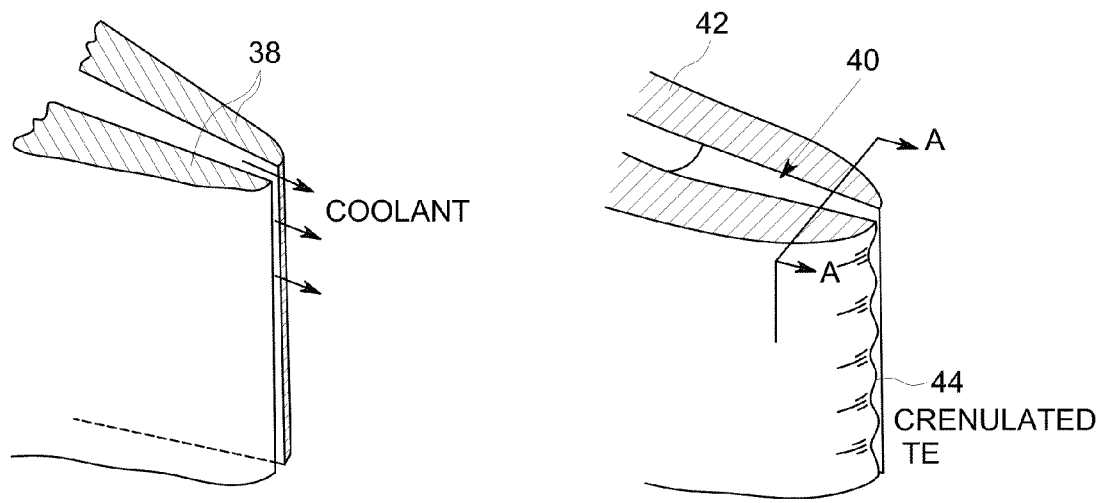
FIG. 3 illustrates a known thick trailing edge cooling scheme comprising a trailing edge slot with straight inner walls, usually used in power generation turbines.
FIG. 4 illustrates a trailing edge slot for a turbine blade or vane in which one of the inner slot walls is crenulated according to one embodiment of the invention.
Figure 5:
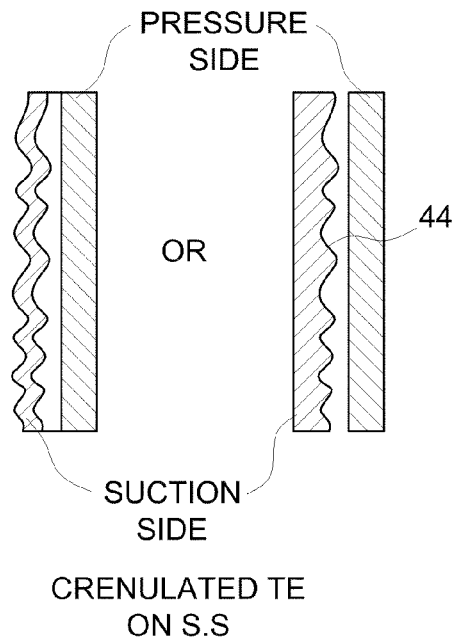
FIG. 5 is an end view of the turbine blade or vane depicted in FIG. 4 according to one embodiment.
Figure 6:
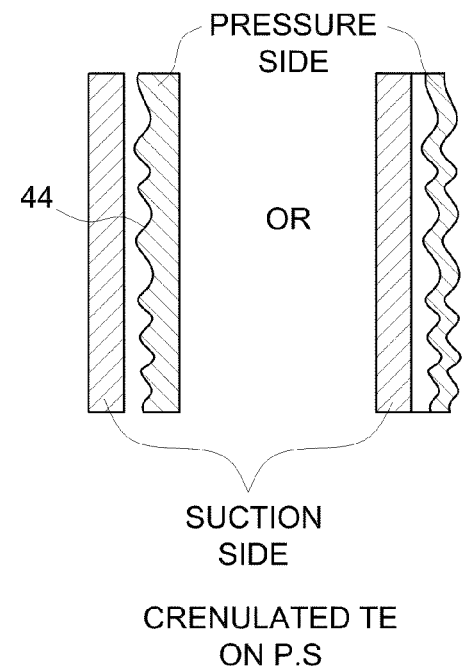
FIG. 6 is an end view of the turbine blade or vane depicted in FIG. 4 according to another embodiment.

FIG. 4 illustrates a trailing edge slot 40 for a HPT turbine blade or vane 42 in which one of the inner slot walls 44 is crenulated according to one embodiment of the invention. FIG. 5 is an end view of the turbine blade or vane 42 depicted in FIG. 4 according to one embodiment. FIG. 6 is an end view of the turbine blade or vane 42 depicted in FIG. 4 according to another embodiment. The crenulated inner slot wall 44 operates to further enhance mixing of a wake generated via the turbine blade 42 beyond that achievable using 1) only fluidic injection elements/structures or cooling holes, 2) using only changes in blade/vane planform or camber, or 3) using fluidic injection elements/structures in combination with trailing edge slots with straight inner walls.

Figure 7:
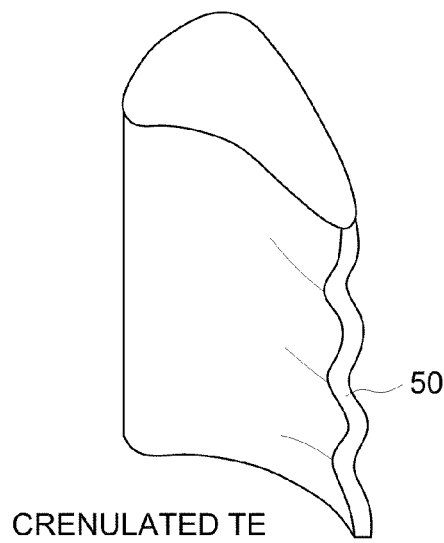
FIG. 7 is a perspective view illustrating a crenulated trailing edge for a turbine blade or vane according to one embodiment.
Figure 8:
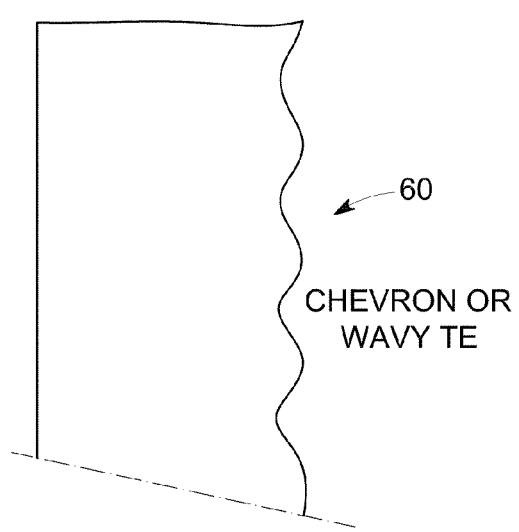
FIG. 8 illustrates a chevron trailing edge for a high pressure turbine blade or vane according to one embodiment.

FIG. 7 is a perspective view illustrating a crenulated trailing edge 50 for a high pressure turbine (HPT) blade or vane according to another embodiment. FIG. 8 illustrates a chevron trailing edge 60 for a high pressure turbine blade or vane according to yet another embodiment. Chevrons 310, as used herein, are defined as triangular serration planform changes that are employed on either the pressure side 304 such as depicted in FIG. 20, suction side such as depicted in FIG. 19, or both the pressure side and suction side of a high pressure turbine blade or vane such as, without limitation, the blade depicted in FIG. 3.

Figure 22:
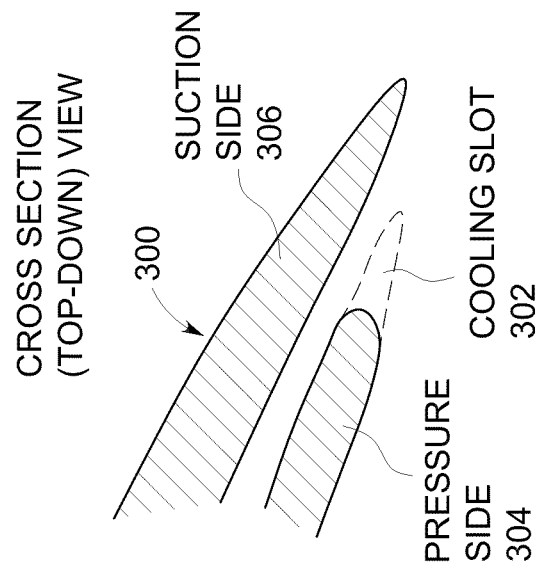
FIG. 22 is a cross-sectional top view of the turbine blade or vane depicted in FIG. 21.
Figure 21:
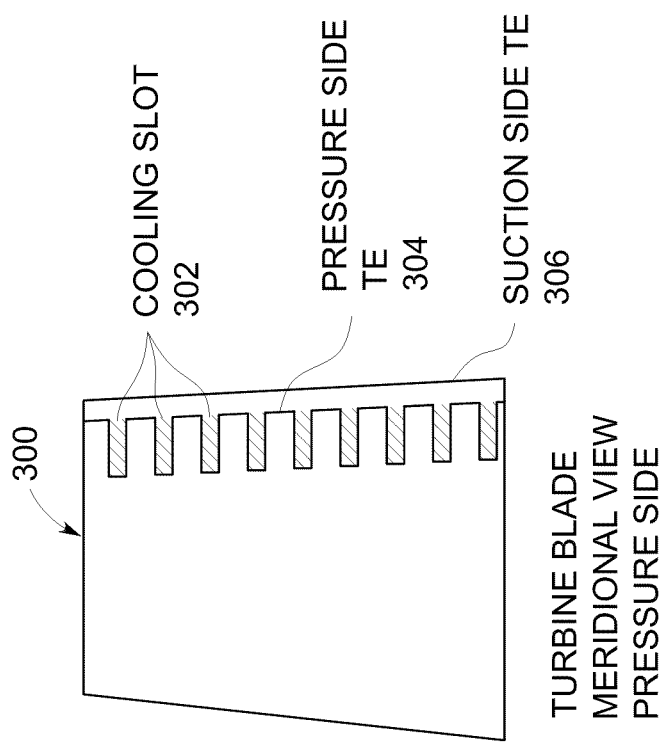
FIG. 21 illustrates cooling slots on the pressure side trailing edge of a turbine blade or vane according to one embodiment.

Gas turbine blades/vanes 300 such as that depicted in FIGS. 21 and 22 having sharp pressure side and suction side trailing edges 304, 306 and pressure side cooling slots 302, for example, may be configured such that either the lower lip or the upper lip or both sides could employ chevrons or crenulated surfaces or combinations of both in which cooling passages 302 are aligned in such a way with the geometrical feature(s) such that the production of streamwise vorticity is maximized FIG. 21 is a side view illustrating a trailing edge portion of a turbine blade/vane 300 suitable for use in aircraft engine applications where the trailing edge 304, 306 is thinner than that used for power generation machines.

Figure 18:
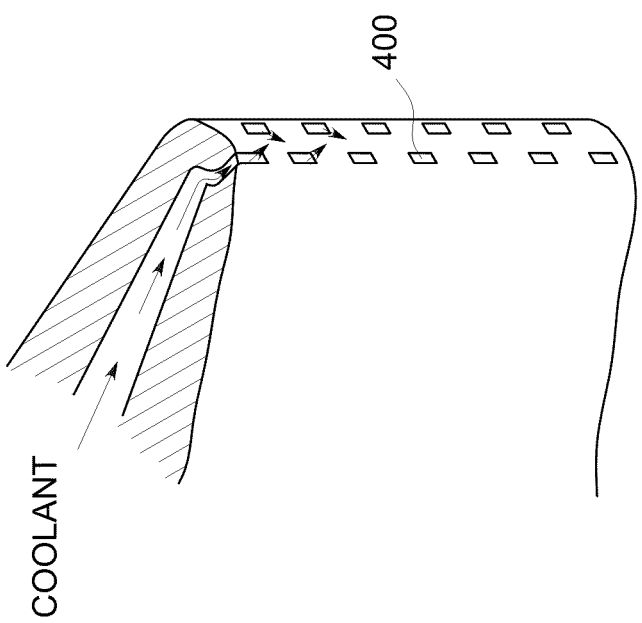
FIG. 18 illustrates fluid injection holes disposed in the trailing edge of a turbine blade or vane according to one embodiment.
Figure 17:
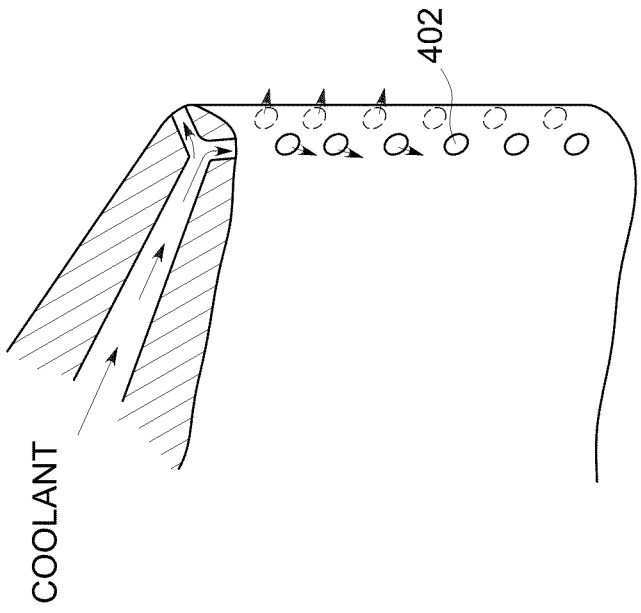
FIG. 17 illustrates fluid injection slots disposed in the trailing edge of a turbine blade or vane according to one embodiment.

A streamwise vortex is thus created via one or more fluid injection elements 400, 402 disposed on the trailing edge (TE) such as depicted in FIGS. 17 and 18 that illustrate fluid injection slots 400 and fluid injection holes 402 respectively, and that may be integrated with one or more geometrical features of a high pressure turbine (HPT) or low pressure turbine (LPT) blade such that local vortices enhance wake mixing beyond that achievable using known techniques. According to one embodiment, each fluid injection element is configured to inject a fluid such as a stream of air into the trailing edge region of a corresponding HPT or LPT turbine blade to interact with a corresponding passage fluid flow and create a streamwise vorticity from the interaction of the injected fluid flow and the passage fluid flow, to enhance mixing out of the wakes behind the trailing edge of the (HP or LP) turbine blade. The enhanced mixing out of the wakes behind the trailing edge of the turbine blade reduces HPT/LPT interaction losses and/or enables shortening of the axial gap between the HPT and LPT components in a gas turbine engine.

Figure 15:
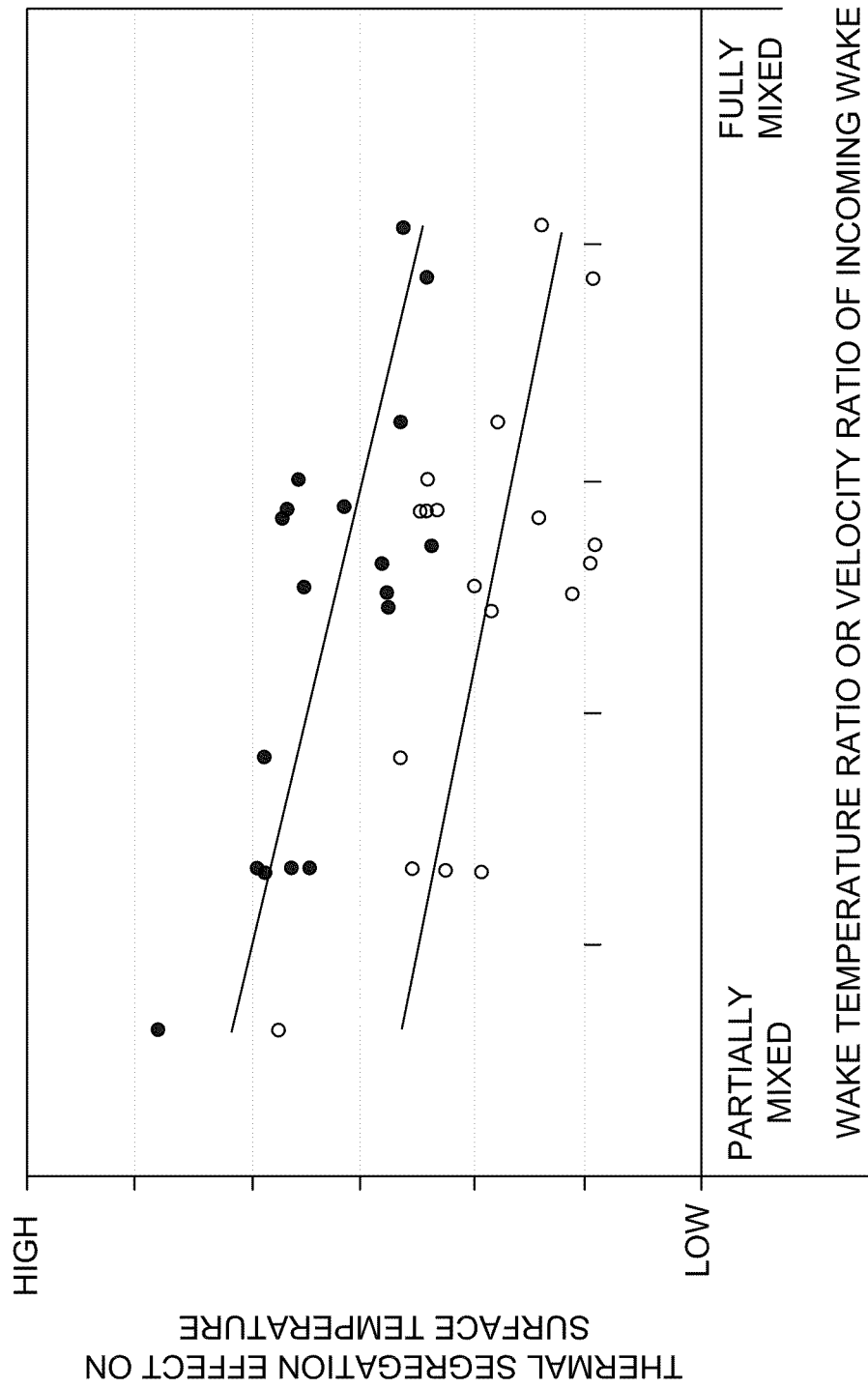
FIG. 15 illustrates the correlation of the wake temperature ratio and the airfoil surface temperature difference based on mixing of the thermal wakes of an upstream blade row to reduce the thermal load of the adjacent downstream blade row by reducing the thermal segregation effect within the downstream blade row according to one embodiment.
Figure 16:
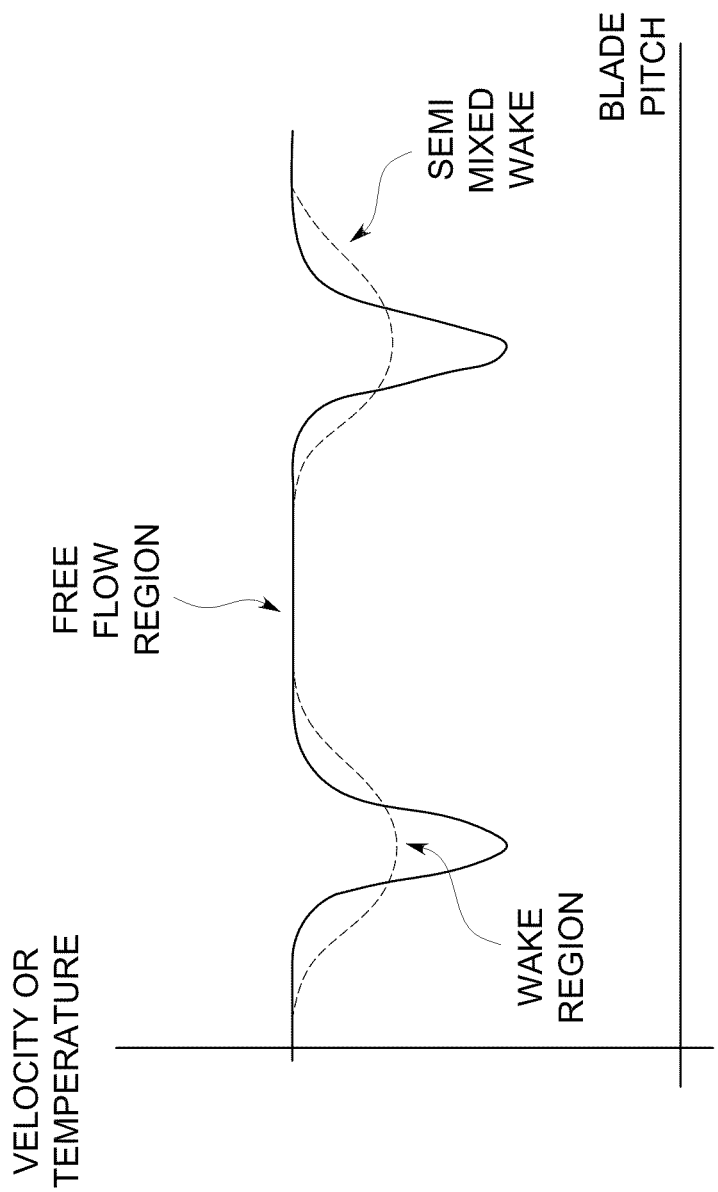
FIG. 16 illustrates the mixing of velocity wakes and thermal wakes in a single sketch.

More specifically, with induction of vortices, system and method embodiments have been described to reduce both the total pressure gradient and the total temperature gradient. This re-conditions the flow that goes into the downstream airfoil row. Mixing of the thermal wakes of an upstream blade row is beneficial to reduce the thermal load of the adjacent downstream blade row by reducing the thermal segregation effect within the downstream blade row. This effect is illustrated in more detail by the graph shown in FIG. 15 that depicts the correlation of the wake temperature ratio and the airfoil surface temperature difference, wherein the wake temperature ratio in the graph is defined as total temperature in the wake region divided by total temperature in the flow region that is outside of the wake.

Existing technology employed for aerodynamic performance can be modified to implement the principles described herein, recognizing that a tradeoff will be required between aerodynamic performance and system/thermal requirements. Thus, existing technology employed for aerodynamic performance can be modified to implement the principles described herein so long as both aerodynamic performance and system/thermal requirements can simultaneously be achieved.

Figure 9:
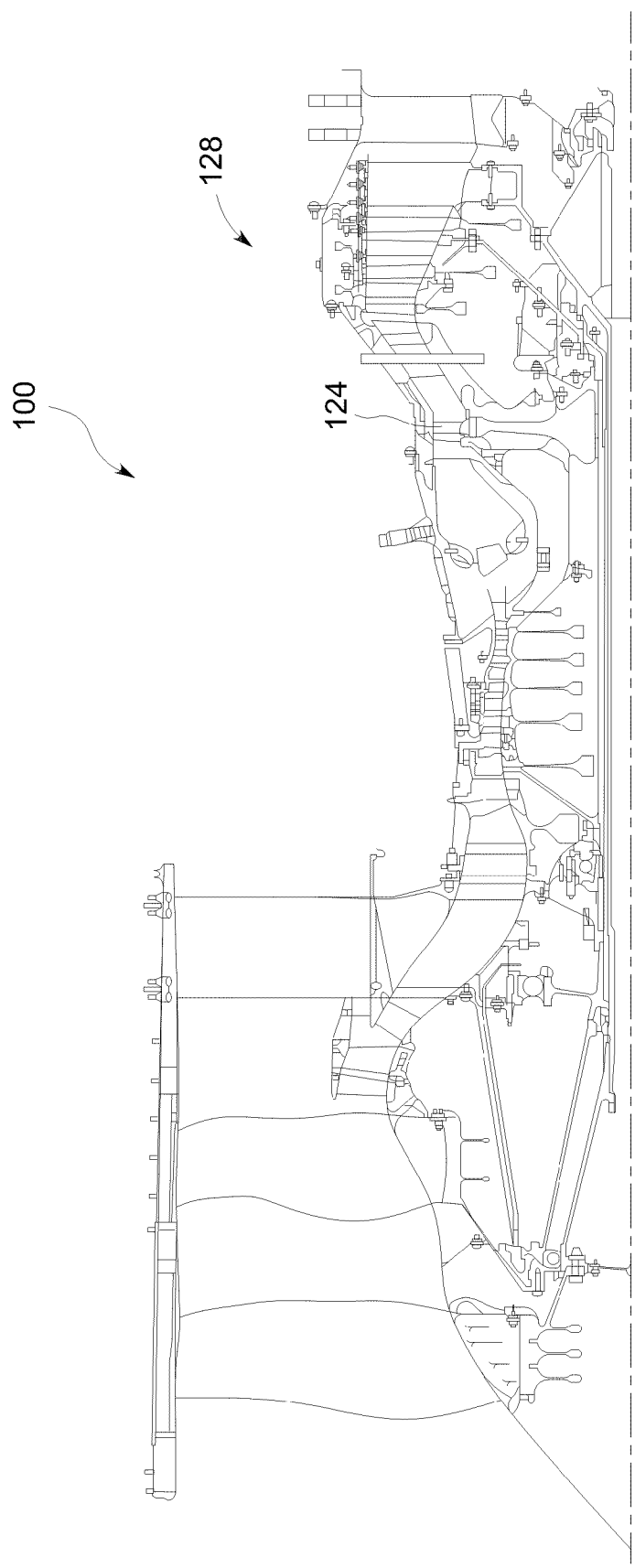
FIG. 9 is a simplified schematic diagram illustrating a gas turbine engine that may employ various embodiments of the invention.

FIG. 9 is a simplified schematic diagram illustrating a cross sectional view of a portion of a gas turbine engine 100 that may employ various embodiments of the invention. Gas turbine engine 100 can be seen to include a HPT 124 interacting with a corresponding LPT 128.

Figure 10:
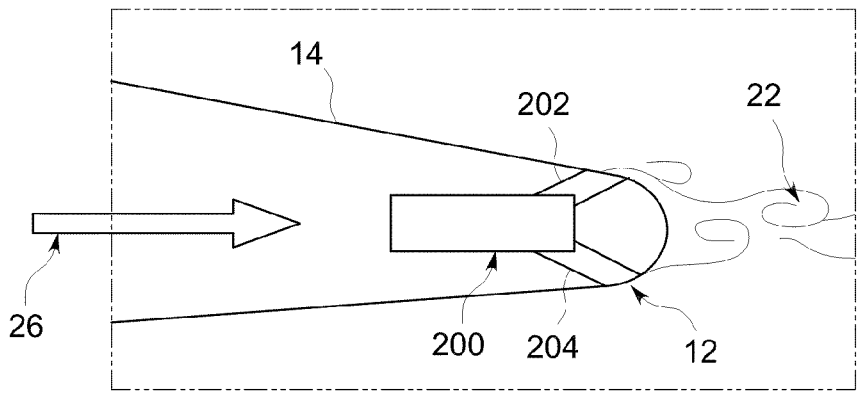
FIG. 10 is a cross-sectional view depicting placement and operation of fluidic injection elements in the trailing edge of a turbine blade to reduce aerodynamic losses due to wake and/or shock interactions and to reduce thermal wake segregation effects to a desirable level according to one embodiment of the invention.

FIG. 10 is a cross-sectional view depicting placement and operation of fluid injection elements 200 in the substantially arcuate trailing edge 12 of a HP or LP turbine blade 14 to reduce aerodynamic losses due to wake and/or shock interactions and further to reduce thermal wake segregation effects to a desirable level according to one embodiment of the invention. Fluid injection elements 200 comprise a pair of fluid injection holes 202, 204 configured to inject a desired fluid 26 such as air according to the principles described herein into both pressure and suction sides of the trailing edge of blade 14.

Figure 11:
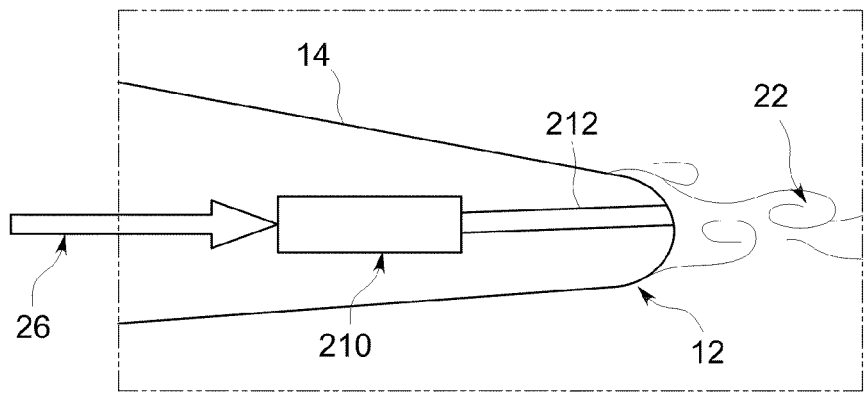
FIG. 11 is a cross-sectional view depicting placement and operation of fluidic injection elements in the trailing edge of a turbine blade to reduce aerodynamic losses due to wake and/or shock interactions and to reduce thermal wake segregation effects to a desirable level according to another embodiment of the invention.

FIG. 11 is a cross-sectional view depicting placement and operation of one or more fluid injection elements 210 in the substantially arcuate trailing edge 12 of a HP or LP turbine blade 14 to reduce aerodynamic losses due to wake and/or shock interactions and further to reduce thermal wake segregation effects to a desirable level according to another embodiment of the invention. A fluid injection hole 212 that forms one portion of fluid injection element 210 is configured to inject a desired fluid 26 such as air according to the principles described herein into the tip portion of the blade 14 trailing edge 12.

Figure 12:
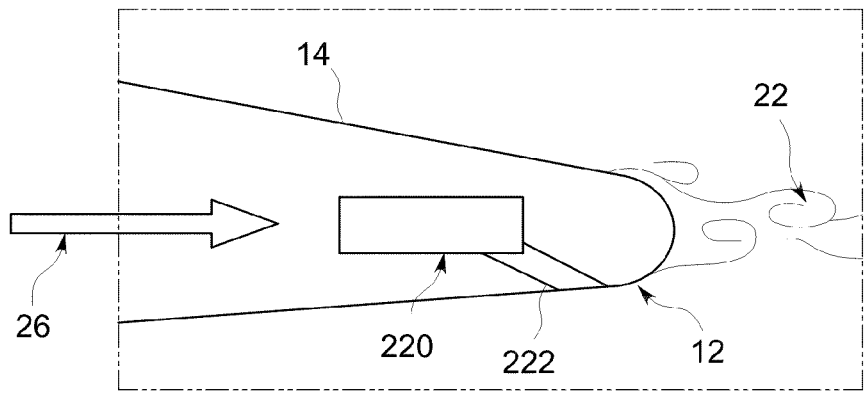
FIG. 12 is a cross-sectional view depicting placement and operation of fluidic injection elements in the trailing edge of a turbine blade to reduce aerodynamic losses due to wake and/or shock interactions and to reduce thermal wake segregation effects to a desirable level according to another embodiment of the invention.
Figure 14:
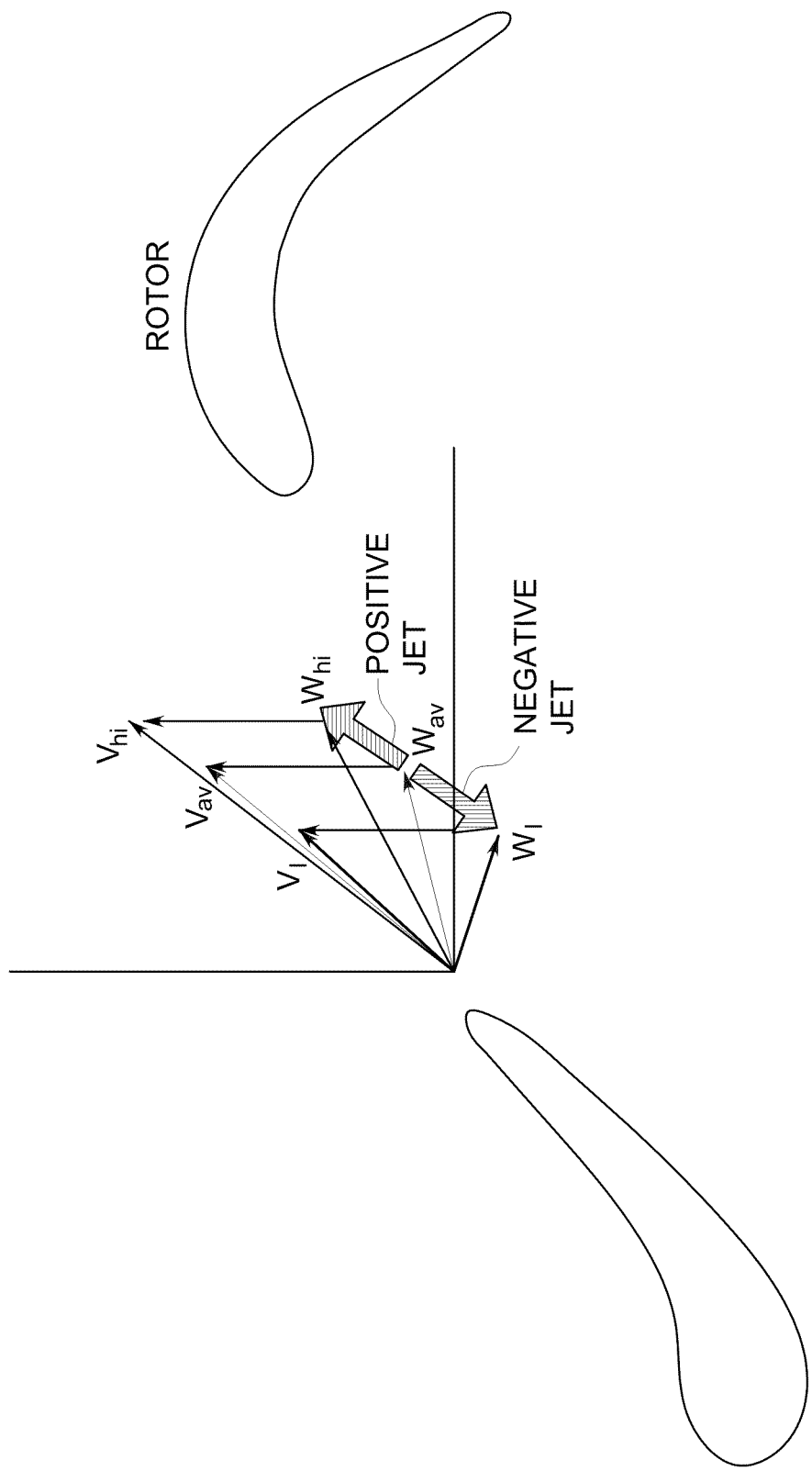
FIG. 14 illustrates a velocity triangle showing the wake of an upstream airfoil introducing a secondary flow, which is often referred to as "slip" velocity, or "negative" jet if the wake has a lower velocity than surrounding flow, or "positive" jet if the wake has a higher velocity than surrounding flow.

FIG. 12 is a cross-sectional view depicting placement and operation of one or more fluid injection elements 220 in the substantially arcuate trailing edge 12 of a HP or LP turbine blade 14 to reduce aerodynamic losses due to wake and/or shock interactions and further to reduce thermal wake segregation effects to a desirable level according to another embodiment of the invention. A fluid injection hole 222 that forms one portion of fluid injection element 220 is configured to inject a desired fluid 26 such as air according to the principles described herein into a pressure side or suction side of the trailing edge 12 of the blade 14.

The embodiments described herein advantageously reduce aerodynamic losses due to wake and shock interactions. These include steady and unsteady losses for transonic vanes/blades and unsteady losses due to wake interactions when blades/vanes are subsonic. The embodiments described herein further advantageously reduce unsteady thermal wake segregation effects that lead to unexpected her-up of endwalls of downstream blades caused by cold wakes and hot post-combustion gases leading to the thermal wake migration effect.

The principles described herein can easily be employed to selectively mix wakes generated via a HP or LP gas turbine blade or vane in which the selection is based upon the type of HPT and/or LPT blade or vane, and such that corresponding aerodynamic losses due to wake and/or shock interactions are reduced to a desirable level, and further such that corresponding thermal wake segregation effects are reduced to a desirable level based on one or more downstream turbine blade or vane aerodynamic and thermal requirements.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A high pressure turbine (HPT) blade or vane comprising: a crenulated trailing edge comprising one or more chevrons disposed on the pressure side, suction side, or both the pressure side and suction side of the HPT blade or vane and configured to enhance mixing out of wakes generated via the HPT blade or vane, such that aerodynamic losses due to corresponding wake and shock interactions are reduced to a desired level, and further such that corresponding thermal wake segregation effects are reduced to a desired level.

2. The HPT blade or vane according to claim 1, wherein the crenulated trailing edge comprises a wavy trailing edge.

3. The HPT blade or vane according to claim 1, wherein the crenulated trailing edge comprises a chevron trailing edge.

4. The HPT blade or vane according to claim 1, wherein the crenulated trailing edge comprises a cooling slot.

5. The HPT blade or vane according to claim 4, wherein at least one inner wall of the slot is crenulated in a spanwise direction of the slot.

6. The HPT blade or vane according to claim 1, further comprising one or more fluid injection structures configured to inject a desired fluid selected from air, a desired gas other than air, and combinations thereof into a desired trailing edge region such that the injected fluid interacts with a passage fluid flow generated via the crenulated trailing edge to reduce aerodynamic losses due to wake and shock interactions and thermal wake segregation effects to a desired level.

7. A high pressure turbine (HPT) blade or vane comprising:
at least one crenulated passage; and
at least one fluid injection element disposed in at least one wall of at least one crenulated passage and configured to inject a fluid there from, wherein the injected fluid interacts with a corresponding crenulated passage fluid flow to create a streamwise vorticity from the interaction of the injected fluid and the passage fluid flow to enhance mixing out of wakes generated via the HPT blade or vane such that aerodynamic losses due to wake and shock interactions are reduced to a desired level, and further such that thermal wake segregation effects are reduced to a desired level.

8. The HPT blade or vane according to claim 7, wherein one or more fluid injection elements are configured to inject the fluid at a predetermined fixed rate of fluid flow simultaneously with pulsatory injection of fluid via a different injection element.

9. The HPT blade or vane according to claim 7, wherein one or more fluid injection elements comprise a fluid injection hole.

10. The HPT blade or vane according to claim 7, wherein one or more fluid injection elements comprise a fluid injection slot.

11. The HPT blade or vane according to claim 7, wherein the one or more fluid injection elements comprise at least one fluid injection hole and at least one fluid injection slot.

12. The HPT blade or vane according to claim 7, wherein each injection element is further configured in terms of size and orientation relative to its corresponding turbine blade or vane, such that the one or more injection elements generate streamwise vorticity with properties comprising at least one of desired vorticity strength, desired vorticity persistence, and desired vorticity frequency.

* * * * *